July 21, 1925.　　　　　　　　　　　　　　　　1,546,620
F. A. CHURCH
SAFETY DEVICE FOR COASTER CARS
Filed Oct. 13, 1924

INVENTOR
FREDERICK A. CHURCH
By
ATTORNEY

Patented July 21, 1925.

1,546,620

UNITED STATES PATENT OFFICE.

FREDERICK A. CHURCH, OF VENICE, CALIFORNIA.

SAFETY DEVICE FOR COASTER CARS.

Application filed October 13, 1924. Serial No. 743,274.

*To all whom it may concern:*

Be it known that I, FREDERICK A. CHURCH, a citizen of the United States, residing at Venice, in the county of Los Angeles, State of California, have invented a new and useful Safety Device for Coaster Cars, of which the following is a specification.

My present invention in safety devices for coaster cars relates particularly to means distinct from the ground wheels thereof, for keeping a coaster car on a supporting track; and a preferred embodiment of my invention, adapted particularly to use upon coaster cars having three-point suspension and connected by universal joints, although capable of use upon cars of any similar construction, may comprise a novel plate, preferably secured near the rear end of a car, and adapted to serve, in its respective parts, both to prevent a car from rising off a track and to receive the upward thrust and frictional wear of a brake applying pressure from beneath said car. Both the lower surface and the upper surface of the mentioned wear plate may, under certain circumstances, simultaneously participate in a braking effect by engagement with substantially stationary parts.

It is an object of this invention to provide coaster cars, and especially such cars as are adapted to be connected in series by universal joints, with means slidable relatively to a track upon which the ground wheels of a car may travel, some of said slidable means being adapted to prevent derailment, and others of said slidable means being adapted to prevent the dropping of a car, or the dropping of the forward end of a car to a dangerous degree, relatively to a supporting track; and one advantageous embodiment of my invention may comprise a car frame, preferably provided with the mentioned wear plates having projecting tongues to prevent derailment, whose front end is provided with brackets serving both as reinforcements of said car and as means for preventing the front end of a car from dropping, as in case of its disconnection, accidentally or otherwise, from a preceding car.

Other objects of my invention will appear from the description of an illustrative embodiment thereof, taken in connection with the appended claims and the accompanying drawings, in which—

Referring to the details of that specific embodiment of my invention chosen for purposes of illustration, 11 may be a main frame of a car 12, the forward end of this frame being shown as supported by means of a ball-carrying bracket 13, seated within a socket 14, upon a preceding car, the construction here referred to being such that each car is provided with a three-point suspension and such that the ball of a universal coupling, by which adjacent cars are connected, is positioned centrally in the axis of a pair of wheels supporting the rear end of the preceding car.

Figure 1:
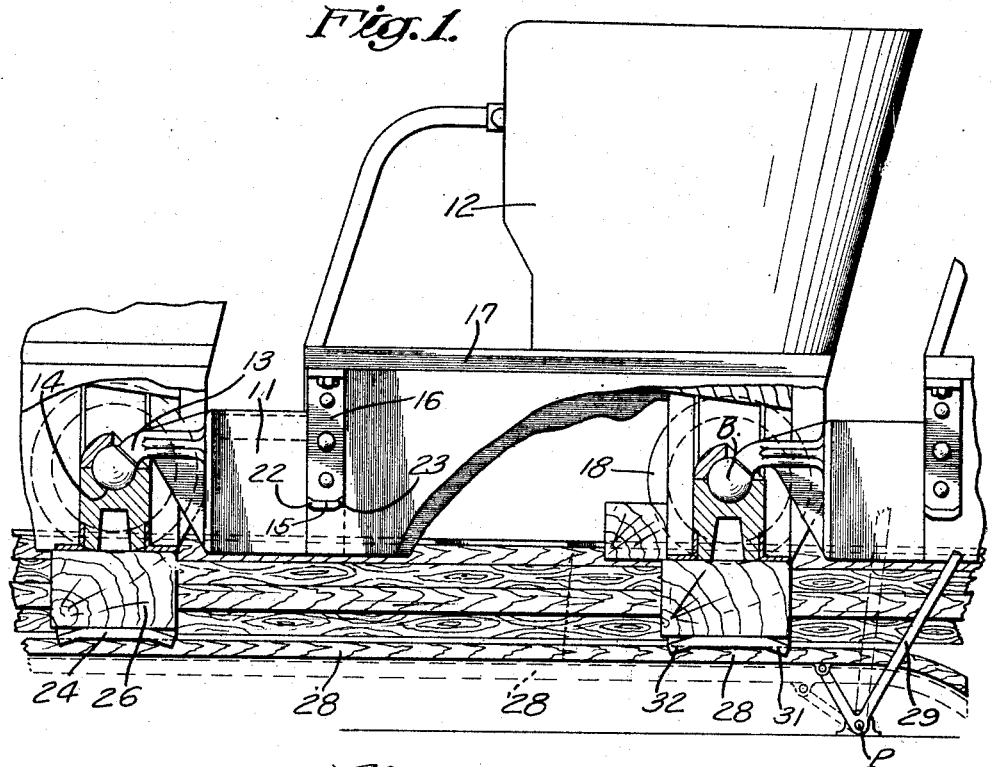
Fig. 1 is a side elevational view, with parts broken away, showing essential parts of a single car and co-operating parts of adjacent cars.

Each car being normally supported, even in the rounding of sharp curves and in the taking of steep grades, by means of the general character just described, my invention comprises an emergency forward support rigidly connected with the frame 11; and this emergency support may be in the form of a horizontally extending arm 15, integral with a substantially U-shaped bracket 16 extending beneath a horizontal plank or shelf 17, shown as constituting a lateral platform or running board externally reinforcing each side of each car. The rear end of each car may be provided with a pair of flanged wheels 18, shown as secured thereto by means comprising substantially U-shaped brackets 19, secured both to a vertical surface, such as that of a car body or that of the main frame element 12, and to a horizontal surface, such as that of a plank or shelf or running board 17; and the forward end of each such plank or shelf may be supported by an upper arm 20 of the mentioned bracket 16, which may be similarly secured at such an elevation that the mentioned lower arm 15 thereof shall normally occupy a position somewhat above the top of a track 21, upon which the mentioned wheels 18, or their equivalent, may be adapted to advance. When positioned as described, it will be obvious that the arms 15 serve as safety devices adapted to prevent the dropping of the front end of a car; and, in order to adapt the same to slide upon the top of the track 21, in case of actual contact therewith, one or both of the edges 22, 23 of the arms 15 may advantageously be rounded or inclined, substantially as shown in Fig. 1.

Figure 2:
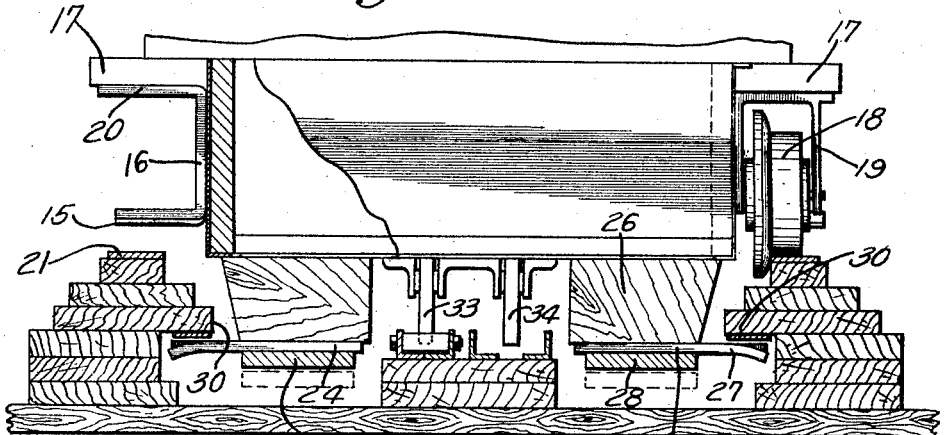
Fig. 2 is a rear view of a car, with parts broken away.
Figure 3:
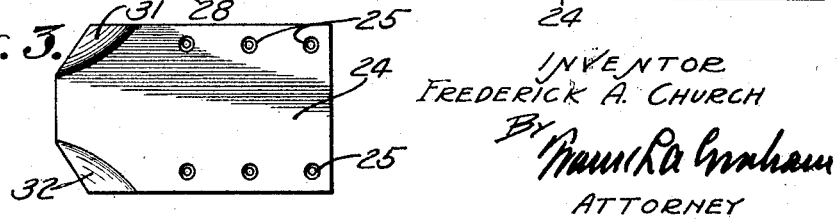
Fig. 3 is a bottom plan view, on a slightly enlarged scale, of a brake or wear-plate, hereinafter described.

The described means being effective to prevent the dropping of one end of a car, I may optionally use therewith or independently thereof, means comprising a unitary plate 24, adapted to serve not only as an element of a brake, but also as a means for preventing an undue rise or an actual derailment of a car. For example, the plate 24, shown as provided with countersunk apertures 25 for the reception of bolts by which the same may be secured, as by means of blocks 26, beneath a car body, may be provided with a rise-limiting tongue or lateral projection 27, not necessarily adapted to be engaged by means of a brake 28 (shown as movable into a position of engagement by means of a lever 29, which may have a stationary pivot P) but adapted to be advanced beneath and to be restrained by an overhanging element or ledge 30, which is disposed parallel with, and may be a part of, the track 21, or a part of a supporting element therefor. As best shown in Figs. 2 and 3, the corners 31, 32 of the plate 24 may advantageously be bent downwardly in such manner as to enable it to slide freely past joints in the ledge 30; and it will be obvious that, upon the elevation of the elongated brake 28, or its equivalent, to stop a car, both the frictional engagement of brake 28 upon the lower surface of the plate 24, and the frictional engagement of the tongue or projection 27 upon the ledge 30, or its equivalent, may be effective in the stopping of a car. Each plate 24 may advantageously be secured in the same vertical plane with the ball element B of the described ball and socket coupling, by which my cars may be connected; and the center of this ball may advantageously be centrally disposed in the axis of rotation of the wheels 18, or their equivalent. To prevent a retrograde movement, means such as the dogs 33, 34, adapted to engage fixed ratchets constituting no part of my present invention, may optionally be added; and the body structure and seating arrangement of each car may be varied as desired.

Although I have herein described a single complete embodiment of my invention, it will be understood that various features thereof might be independently employed, and also that various modifications might be made, by those skilled in the art to which this case relates, without the slightest departure from the spirit and scope of my invention, as the same is indicated above and in the following claims.

I claim as my invention:

1. In a safety device for coaster cars, each comprising a substantially rigid body supported by wheels adapted to run on tracks; means for supporting beneath each car body a wear plate adapted to be engaged by a brake having a stationary support; and a wear plate, secured to said supporting means and integral with means, projecting beneath an element of said track, for preventing the derailment of said car.

2. In a safety device for coaster cars, a brake wear plate integral with a rise-limiting tongue having downwardly deflected corners.

3. In a safety organization for coaster cars comprising frames carrying wheels adapted to engage tracks, the combination of: substantially U-shaped brackets reinforcing said frames and each comprising an arm extending over a track in such manner as to provide an emergency support therefor.

4. In a safety organization for coaster cars comprising frames carrying wheels adapted to engage tracks, the combination of: substantially U-shaped brackets reinforcing said frames and each comprising an arm extending over a track in such manner as to provide an emergency support therefor, each car being provided near its forward end with a pair of the mentioned brackets, and each bracket being provided with means for the support of a substantially horizontal shelf or running board external to said car.

5. In a safety organization for coaster cars comprising frames carrying wheels adapted to engage tracks, the combination of: substantially U-shaped brackets reinforcing said frames and each comprising an arm extending over a track in such manner as to provide an emergency support therefor, each car being provided near its forward end with a pair of the mentioned brackets, and each bracket being provided with means for the support of a substantially horizontal shelf or running board external to said car; and each car being provided also with means in the form of a brake wear plate integral with a rise-limiting tongue for preventing derailment.

6. In a safety organization for trains of coaster cars, each provided with a pair of wheels near one end thereof and with a universal coupling near the other end thereof; means, in substantially the same vertical plane with said wheels, for limiting the rise of the same from a track; and means in a plane intermediate the mentioned plane and said universal coupling for limiting the drop of a car relatively to said track.

7. In a safety organization for trains of coaster cars, each provided with a pair of wheels near one end thereof and with a universal coupling near the other end thereof; means in substantially the same vertical plane with said wheels, for limiting the rise of the same from a track; and means in a plane intermediate the mentioned plane and said universal coupling for limiting the drop of a car relatively to said track, said rise-limiting means being a projection integral with a brake wear plate.

8. In a safety organization for trains of coaster cars, each provided with a pair of wheels near one end thereof and with a universal coupling near the other end thereof; means in substantially the same vertical plane with said wheels, for limiting the rise of the same from a track; and means in a plane intermediate the mentioned plane and said universal coupling for limiting the drop of a car relatively to said track, said rise-limiting means being a projection integral with a brake wear plate, and said drop-limiting means being integral with a reinforcing bracket.

9. In a safety organization for trains of coaster cars, each provided with a pair of wheels near one end thereof and with a universal coupling near the other end thereof; means in substantially the same vertical plane with said wheels, for limiting the rise of the same from a track; and means in a plane intermediate the mentioned plane and said universal coupling for limiting the drop of a car relatively to said track, said rise-limiting means being a projection integral with a brake wear plate, and said drop-limiting means being integral with a reinforcing bracket, both said rise-limiting and said drop-limiting means being rigidly secured to the frame or body of a car.

In testimony whereof, I have hereunto set my hand at Los Angeles, California, this 6th day of October, 1924.

FREDERICK A. CHURCH.